H. GANT.
DOUBLETREE.
APPLICATION FILED JULY 30, 1918.
1,355,138. Patented Oct. 12, 1920.
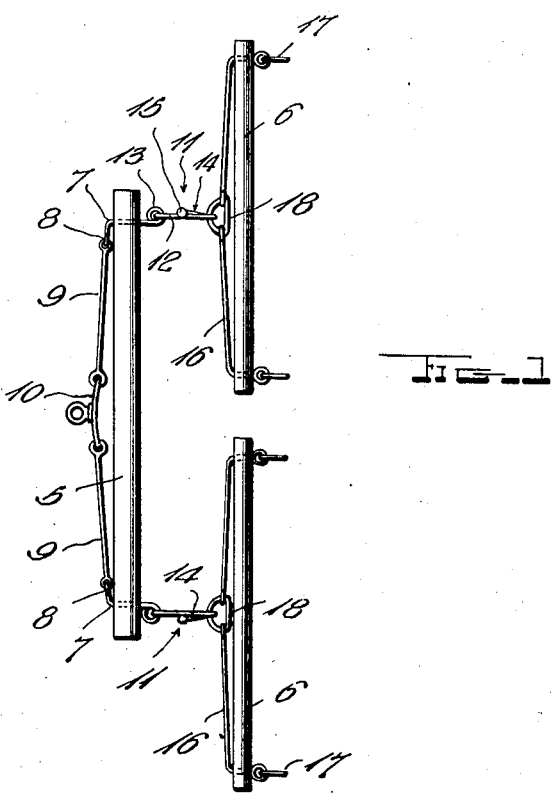
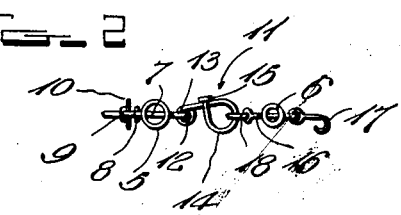
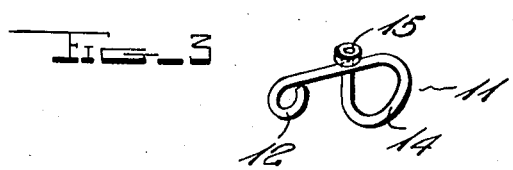
Inventor
Harvey Gant
By C. C. Hines,
Attorney.

UNITED STATES PATENT OFFICE.

HARVEY GANT, OF POWERS, OREGON.

DOUBLETREE.

1,355,138.  Specification of Letters Patent.  Patented Oct. 12, 1920.

Application filed July 30, 1918. Serial No. 247,421.

*To all whom it may concern:*

Be it known that I, HARVEY GANT, a citizen of the United States, residing at Powers, in the county of Coos and State of Oregon, have invented new and useful Improvements in Doubletrees, of which the following is a specification.

This invention is an improvement in draft appliances and has particular reference to a double tree construction.

An object of the invention is to provide a simple and inexpensive connection between a double tree and swingle trees which are attached thereto whereby the use of clevises, from which the pins are frequently lost, is avoided.

Another object is the provision of such a construction between the double and swingle trees as will enable the operator to easily and quickly accomplish the operation of attaching and detaching the swingle trees and which will effectively prevent accidental detachment thereof.

The inventive idea involved is capable of receiving a variety of mechanical expressions one of which, for the purpose of illustrating the invention, is shown in the accompanying drawing, wherein:—

Figure 1 is a plan view of the device constructed in accordance with the invention.

Fig. 2 is a side elevation thereof.

Fig. 3 is an enlarged detail perspective view of the connection between the double and swingle trees.

The invention is shown in what is now believed to be its preferred form which comprises a double tree 5 made of any desirable material and, in the present instance, is formed from a suitable length of iron rod or pipe. A swingle tree 6, also made of material similar to the double tree, is connected to each end of the latter and, for this purpose, an angular link 7 has a portion thereof mounted transversely through the double tree 5 adjacent each end thereof and its remaining portion turned inwardly and longitudinally of said tree. The end of said remaining portion of each link is provided with a loop 8 to which is connected one end of a rod 9 and said rods also extend inwardly toward each other and in substantial longitudinal relation with respect to the tree 5. The inner ends of the rods 9 are connected by a coupling plate 10 employed for the purpose of connecting the double tree to its support in the usual manner.

A connecting element 11 is employed for attaching each of the swingle trees 6 to its respective link 7 and this connection is preferably formed from a single length of rod having one end 12 looped for permanent attachment to the loop 13 of the link 7. The other end of the rod is curved to provide the hook 14, the extremity of which intersects and engages the shank portion and is provided with a locking lug 15 adapted to also frictionally engage said portion and aid in preventing any possible distortion of the hook due to a pulling strain placed thereon by the draft animal.

Each swingle tree 6 has preferably secured adjacent each end thereof one end of a rod 16 to which is secured the usual trace fastener 17 and the major portions of said rods 16 are extended inwardly and longitudinally of the tree 6 and have their inner ends connected to an attaching ring 18 of a semicircular formation.

In practice, the ring 18 of each swingle tree is connected to the respective hook 14 by engaging the arcuate portion of the ring over the extremity of the hook and forcing the same between said extremity and the shank portion, it being understood that the resiliency of the rod of which the connecting element is formed will maintain said extremity and shank portion in contact and thus prevent any detachment of the ring until the pressure between said parts, due to said resiliency of the rod, is overcome. It will also be obvious that any tendency to straighten or distort the hook by an unusually heavy pull upon the swingle tree will be prevented by the locking lug or abutment 15 which engages said shank portion.

Having thus fully described my invention, I claim:

1. The combination with a double tree, of swingle trees therefor, and connecting means extending between said swingle trees and the double tree, said connecting means comprising a member formed to provide oppositely disposed eyes, one of said eyes having its free end projecting above an intermediate portion of said member and having a headed end portion overlying said intermediate portion of said member.

2. In a device of the class described, a connecting hook comprising a rod-like member bent to provide oppositely disposed eyes arranged in a common plane at one side of the intermediate portion thereof, one of said eyes having its free end projecting above the intermediate portion of the member, and a lug member carried at the extremity of said free end of said eye and overlying the intermediate portion of said member.

3. In a device of the class described, a connecting hook comprising a member formed of a single piece of relatively heavy rod-like material, said member having its opposite ends bent to provide eyes disposed in a common plane at one side of the intermediate portion thereof, one of said eyes being of relatively greater circumference than the other and having its free end extending into and at one side of the plane of the intermediate portion of said member, and a circular lug formed at the free end of said larger eye and arranged to overlie in contacting relation the said intermediate portion of said member.

In testimony whereof I affix my signature.

HARVEY GANT.